United States Patent
Jung

(10) Patent No.: US 8,676,723 B2
(45) Date of Patent: Mar. 18, 2014

(54) AUTOMATED TEST SYSTEM BASED ON THREE-DIMENSIONAL APPLICATION SOFTWARE FRAMEWORK AND A METHOD THEREOF

(75) Inventor: Byung Soo Jung, Gyeonggido (KR)

(73) Assignee: Codese Co., Ltd., Seoul (KR)

( * ) Notice: Subject to any disclaimer, the term of this patent is extended or adjusted under 35 U.S.C. 154(b) by 979 days.

(21) Appl. No.: 12/672,878

(22) PCT Filed: Mar. 3, 2009

(86) PCT No.: PCT/KR2009/001031
§ 371 (c)(1),
(2), (4) Date: May 13, 2010

(87) PCT Pub. No.: WO2009/110725
PCT Pub. Date: Sep. 11, 2009

(65) Prior Publication Data
US 2011/0125448 A1 May 26, 2011

(30) Foreign Application Priority Data

Mar. 4, 2008 (KR) .......................... 10-2008-0019855
May 19, 2008 (KR) .......................... 10-2008-0045885

(51) Int. Cl.
*G06F 15/18* (2006.01)
(52) U.S. Cl.
USPC .......................................................... 706/12
(58) Field of Classification Search
USPC ................................................ 706/12, 45, 62
See application file for complete search history.

(56) References Cited

U.S. PATENT DOCUMENTS

| | | | | |
|---|---|---|---|---|
| 5,335,342 | A | * | 8/1994 | Pope et al. ................. 714/38.13 |
| 6,532,401 | B2 | * | 3/2003 | Tackett et al. ................. 700/245 |
| 7,398,514 | B2 | | 7/2008 | Ulrich et al. |
| 2002/0058456 | A1 | * | 5/2002 | Miller ............................. 446/85 |
| 2004/0249809 | A1 | * | 12/2004 | Ramani et al. .................... 707/4 |
| 2005/0193269 | A1 | * | 9/2005 | Haswell et al. ................. 714/38 |
| 2006/0070035 | A1 | | 3/2006 | Ulrich et al. |
| 2006/0074730 | A1 | | 4/2006 | Shukla et al. |

(Continued)

FOREIGN PATENT DOCUMENTS

| | | |
|---|---|---|
| KR | 10-2006-0050378 | 5/2006 |
| KR | 10-2006-0087995 | 8/2006 |
| KR | 10-2007-0049126 | 5/2007 |

OTHER PUBLICATIONS

International Search Report of International Application PCT/KR2009/001031 mailed Oct. 22, 2009.

*Primary Examiner* — David Vincent
(74) *Attorney, Agent, or Firm* — Rabin & Berdo, P.C.

(57) ABSTRACT

A three-dimensional application program framework structure; a method for implementing an application program based on the same; and an automatic testing system based on a three-dimensional application software framework and a method therefor. The three-dimensional application program framework structure provides a framework comprising functions and management of the environment of the system and events to be implemented by the user (developer), and the developer can easily expand the graphic user interface (GUI) and an actual modeling function as required, and user model. In addition, by using an automatic test system based on the framework, it is possible to record the function-execution history of the user and to automatically generate a test case, and to thereby test the functioning of the application software through the use of the test case regardless of changes in the source code and the GUI.

8 Claims, 9 Drawing Sheets

(56) References Cited

U.S. PATENT DOCUMENTS

| | | |
|---|---|---|
| 2006/0074735 A1 | 4/2006 | Shukla et al. |
| 2006/0285755 A1* | 12/2006 | Hager et al. ............ 382/224 |
| 2007/0094189 A1* | 4/2007 | Yamamoto et al. ............ 706/45 |
| 2007/0240102 A1* | 10/2007 | Bello et al. ............ 717/104 |
| 2008/0092057 A1* | 4/2008 | Monson et al. ............ 715/744 |
| 2010/0198799 A1* | 8/2010 | Krishnan et al. ............ 707/702 |

* cited by examiner

AUTOMATED TEST SYSTEM BASED ON THREE-DIMENSIONAL APPLICATION SOFTWARE FRAMEWORK AND A METHOD THEREOF

CROSS-REFERENCE TO RELATED APPLICATIONS

The present application is a national stage application under 35 U.S.C. §371 of International Application No. PCT/KR09/001031 with an international filing date of Mar. 3, 2009, and claims priority to KR10-2008-0019855, filed Mar. 4, 2008, and KR10-2008-0045885, filed May 19, 2008.

BACKGROUND OF THE INVENTION

1. Field of the Invention

The present invention relates, in general, to three-dimensional application programs, and, more particularly, to technology for constructing a three-dimensional application program framework, a method of implementing an application program based on the framework, and automated test technology based on a three-dimensional application software framework.

2. Discussion of Background Information

Currently, technology supporting three-dimensional (3D) images and the modeling of 3D images has been presented, and the development of technology commercializing electronic home appliances and other electronic devices based on this supportive technology is being actively pursued. The provision of 3D images and the display of 3D images on electronic home appliances and electronic devices must accompany the development of relevant content. Various types of 3D application programs for such displays have been presented.

The various types of 3D application programs require both a unique model and a related modeling function. In addition, they require common functions, such as those that, render display and select models, and manage undo/redo functions. The introduction of 3D application programs to the fields of Computer Aided Engineering (CAE) systems, as well as Computer Aided Design (CAD) and game fields, has actively increased as the importance of Research and Development (R&D) by businesses has become greater.

Further, demands for the development of analysis systems for the exclusive use of 3D modeling have increased, and in addition, 3D application programs have extended to fields developing 3D modeling application programs such as medical, educational and virtual reality fields, as well as engineering fields. Currently commercialized 3D application program framework products include HOOPS of U.S. Tech Soft 3D (www.techsoft3d.com), and related commercialized products in similar fields, including but not limited to GLView of Norwegian Ceetron ASA (www.ceetron.com) and, ExtremeToolkit of U.S. Codejock Software (www.codejock.com), etc.

In this case, 3D application programs require a unique model and a related modeling function, as well as common functions such as rendering, displaying and selecting models, and managing the undo/redo functions. In particular, in 3D application programs, selecting models may be regarded as an important factor which determines the convenience and production efficiency of 3D application software. Most modeling functions begin with the model selection operation using a mouse on a view window, which is accompanied by several steps of complicated model selection operations in order to execute a single function.

As the level of client requests for the above-described 3D modeling application programs has increased, the period and cost required for the development of software have increased, and, in addition, methods for ensuring program quality have gradually become important because the size of programs has increased. Therefore, the functions of development tools and components for 3D modeling are expected to be very important and related markets are expected to continuously expand in the future. However, 3D application program framework products provided in the related art provide just a basic Graphical User Interface (GUI) library, and they are expensive. Thus, they are exclusive to the fields of expensive application programs in CAD/Computer Aided Manufacturing (CAM)/CAE. As such, it is difficult to use currently commercialized 3D application programs in personal homes, research institutes, and small to mid-sized businesses due to reasons of cost and functionality.

In an unsuccessful attempt to solve aforesaid problems, framework products have been developed, but they are difficult to use, such that it is difficult not only to develop, but also to maintain, the conventional 3D modeling application programs. It is difficult to predict program reliability for these programs. Therefore, the development of products for ensuring stability and functionality on the basis of the extension of modeling functions and a GUI that can be easily used by developers is desired, and, in addition, there is a need to assign an automated test function to improve the reliability of products.

The level of client requests for 3D modeling application software has increased, increasing the period and cost required for the development of software, and, in addition, methods for ensuring software quality have gradually become important as the sizes of programs have increased. When 3D modeling application software is developed, the performance and reliability of relevant 3D modeling application software need to be tested.

As technology for the above-described automated test function, automated white-box test technology and automated black-box test technology are presented herein. The automated white-box test technology is a technology which automatically generates a test case based on source code and automatically tests the performance and potential errors of application software using the test case.

In this case, the conventional automated white-box test technology can be problematic. Because a test case is generated based on source code, it is impossible to generate reliable test cases for a user's model selection operation having an infinite number of cases. Further, the conventional automated white-box test technology is problematic in that functions must be called and variables must be adjusted at the time of replaying a test case. Accordingly, a test case must be regenerated when the source code is changed.

Further, the conventional automated white-box test technology is problematic because it requires that a test case be generated by the analysis of source code, making it is impossible to generate a view manipulation test case and a selection test case. This is because function-based input/output data must be stored and large-capacity model data requires an excessively large amount of memory, thereby making it impossible to use large-capacity model data.

Meanwhile, the above-described automated black-box test technology is a technology which generates and replays a test case by recording an event on a GUI manipulated by a user, thus automating the testing of relevant application software. An example of the automated black-box test technology is presented in U.S. Pat. No. 5,335,342 to Pope, et al., entitled "Automated software testing system", (hereinafter "Pope").

Pope discloses a technology in which the testing of application software is automated by recording a user's input operation using a mouse or a keyboard, storing a resultant screen corresponding to the user's input as an image, and replaying the user's input operation based on the stored data. The results of the test are verified by comparing the resultant screen image with a stored image.

However, conventional automated black-box test technology is constructed such that recording a user input operation using a mouse or a keyboard allows a model selection operation to be replayed and tested. However, this can be problematic. For example, when user preferences such as the speed of screen manipulation (for example, rotation, magnification/reduction, and movement) and the sensitivity (range) and method of model selection, which directly influence the results of model selection, are changed after test cases are generated, identical operation results cannot be obtained, thus making it impossible to perform the test of functions of relevant application software.

That is, the conventional automated black-box test technology for recording a GUI event by a user and generating a test case can be problematic. For example, when a GUI changes as a relevant GUI element identifier changes or a single GUI element is divided into a plurality of elements, a test case must be regenerated.

Further, the conventional automated black-box test technology is also problematic because it enables only a process test, which records a user's manipulation and generates and replays a test case, and a performance test, and the comparison of the results of the test is performed only by comparison between screen images. It is impossible to compare data which is not displayed on the screen, and, in the case of model data having complicated and various components, it is difficult to analyze and treat ineffective resultant errors of modeling only by performing comparison between images.

Additionally, the conventional automated black-box test technology is also problematic because the results of the test change depending on the speed of processing of view manipulation, it is impossible to replay view manipulation using only an event because the accurate replay of view manipulation is impossible. Additionally, a selection test is impossible because only images are compared, the comparison of model data is impossible due to a large number of factors such as a graphic card, a background color, and a model color, and because the test is a GUI event-based test, it is difficult not only to detect an accurate error location, but also to perform function-based verification and analysis.

SUMMARY OF THE INVENTION

Accordingly, the present invention is intended to construct a 3D application program framework structure and an automated test system capable of testing the function of relevant application software, based on the framework structure. The 3D application program framework structure allows a developer to easily extend a user model or an actual modeling function and a GUI, thus facilitating the development of a 3D modeling application program and enabling the maintenance and stable execution of an application program.

As described above, a three-dimensional (3D) application program framework structure presented in the present invention includes a first modeling component, including a first modeling function having a 3D modeling utility and a modeling kernel for managing model data, a first display component for supporting displaying of various types of models based on the first modeling component and supporting viewing of a currently selected model (e.g., movement, rotation, magnification, and the like), a first rendering component connected to the first display component and configured to support a rendering tool, a model selection processing component for selecting and processing various types of model elements (e.g., a point, a line, a plane, and the like) displayed based on the first modeling component, a first Graphical User Interface (GUI) component for providing an interface with the user in relation to operations such as displaying, selection and viewing of models, a user extension component for allowing the user to implement and register a modeling function, a display function and a GUI function when an application program is developed, a function management component for requesting a model selection operation of the user from the model selection processing component at a time of managing and operating the user functions, and controlling the GUI component to provide GUI control of the user functions, and a framework system for making connections between the individual components and a user main module, which is implemented when the 3D application program is developed so as to process a main window, a view window, a menu, and a toolbar at the time of execution of the 3D application program, and connections between the components, and controlling operation of the individual components including management of events and system environment.

In detail, the first modeling component includes a modeling kernel for managing a plurality of pieces of large-capacity model data and a modeling function component having a 3D modeling utility, and the rendering component includes a rendering tool such as OpenGL or DirectX.

Further, the user extension component includes a user main module connected to the framework system, a user function module configured to register user functions such as an actual modeling function and other software operating functions, which are extended and implemented by an application program developer (hereinafter "developer"), a second modeling component extended and registered to meet necessities of the developer, a second display component extended and registered by the developer to support displaying of various types of models and viewing of a currently selected model, a second rending component configured to register a rendering tool extended to meet necessities of the developer, and a second GUI component implemented by the developer to extend the interface with the user.

Further, the present invention presents a method of implementing an application program based on the 3D application program framework structure. The method comprises the following essential basic components for the development of the application program: installing a basic framework, which includes a function management component, a model selection processing component and a framework system for connecting a user main module, which processes a main window, a view window, a menu, and a toolbar when the 3D application program is executed, to the components, a developer personally creating an operation project so that the main window, the view window, the menu, and the toolbar are processed when the 3D application program is executed, and then implementing a user main module, connecting the basic framework to the user main module, the developer extending a user model data management function, a modeling function, a display function, and a GUI function, and registering the extended functions in the basic framework, and implementing a user function for executing and controlling the extended and registered functions, and adding the user function to the basic framework.

The present invention constructs an automated test system for the 3D application program framework structure or an application program based on the 3D application program framework structure. The automated test system records history of user operations and automatically generates a test case, thus enabling both precise replay and verification of view manipulation and selection even when preferences are changed, and also enabling function-based tests such as comparison and verification of resulting model data performed on a per function basis and the detection of performance and precise error locations performed on a function basis.

The present invention provides a system for testing 3D application software based on the 3D application program framework structure including a user main module, a user function module, a function management component, a model selection processing component, user-extensible components and a framework system for controlling operation of the components, the system comprises a database (DB) for storing at least one test case, a GUI automated test component for generating a test case of a unit function, storing the generated test case in the DB, and executing a test on a GUI, an automated test processor for executing an automated test on 3D application software based on a relevant test case recorded in the DB and providing results of the execution to a user when an automated unit function test or a process test is executed, a model test component for performing comparison/verification with model data stored in the DB for individual test steps of the automated unit function test and the process test and notifying the automated test processor of results of the verification, and an automated test controller for executing an operation of the automated test processor when the automated test by the user is detected.

According to the present invention, the automated test processor can be configured such that, when the automated unit function test is intended to be executed, the automated test processor runs the GUI automated test component, generates/stores a relevant test case, and executes the automated unit function test on the 3D application software, based on the test case recorded in the DB. Then, when the process test is intended to be executed, the automated test processor records the user's manipulation on application software, generates/stores a test case in the DB, and executes the process test on the 3D application software, based on the relevant test case recorded in the DB, and thus the results of the execution are provided to the user.

Further, the automated test controller can be inserted into (or added to) the user function module, so that a function of controlling the automated unit function test and the process test is added to the 3D application software.

The automated test processor can be implemented based on the framework processor of the function management component and replaces the framework processor of the function management component, thus adding a function of processing the automated unit function test and the process test to the 3D application software.

The GUI automated test component can be implemented based on a GUI component and replaces the GUI component, thus adding both a function of generating a test case corresponding to a sampled value for the automated unit function test and a GUI test function to the 3D application software.

The model test component can be implemented based on a 3D modeling kernel and replaces the 3D modeling kernel, thus adding a function of performing more precise comparison/verification with model data stored in the DB for individual test steps of the automated unit function test and the process test to the 3D application software.

Meanwhile, a test method according to the present invention comprises: determining whether an automated test is intended to be executed, if it is determined that the automated test is intended to be executed, generating and storing a relevant test case, testing 3D application software based on the relevant test case which has been generated/stored, and providing the results of the test to the user.

Testing the 3D application software comprises: when the process test is intended to be executed, recording the user's manipulation on application software, generating/storing a relevant test case and executing the process test on the 3D application program, based on the test case.

Testing the 3D application software further comprises performing comparison/verification with model data stored in the DB for individual test steps of the process test, and feeding results of the verification back to a relevant test step, and then notifying the user of the results of the verification.

BRIEF DESCRIPTION OF THE DRAWINGS

These and other features, aspects and advantages of the present invention will become better understood with regard to the following description, appended claims, and accompanying drawings, wherein:

DETAILED DESCRIPTION OF EMBODIMENTS

Hereinafter, embodiments of a three-dimensional (3D) application program framework structure according to the present invention are described in detail with reference to the attached drawings.

Figure 1:
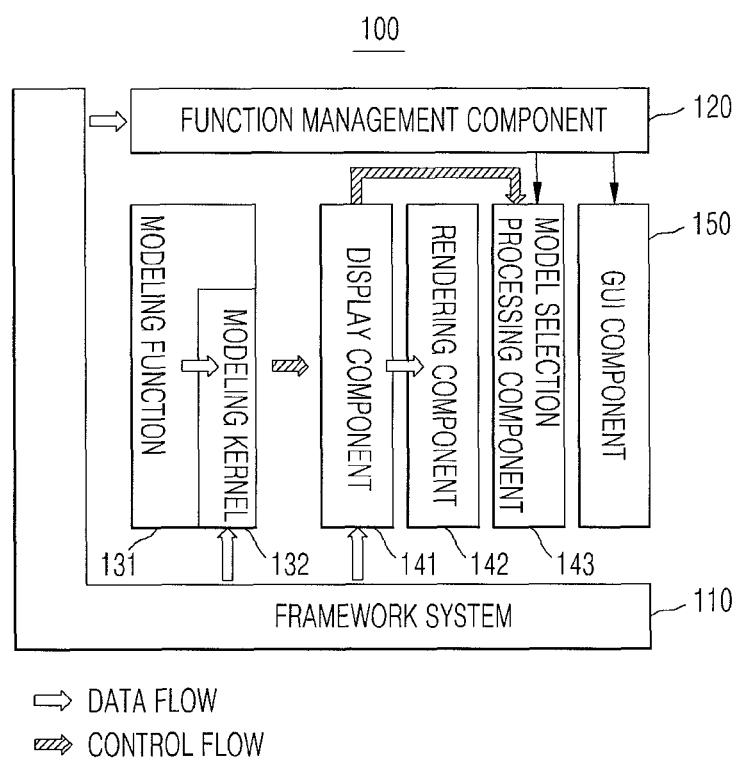
FIG. 1 is a diagram showing a basic framework structure according to an embodiment of the present invention.

FIG. 1 is a diagram showing a basic framework structure according to an embodiment of the present invention. As shown in the drawing, the basic framework structure includes a modeling function component 131 including a 3D modeling utility and performing a modeling operation, a modeling kernel 132 for managing a plurality of pieces of 3D model data and applying the results of the modeling operation to relevant model data, a rendering component 142 for supporting a rendering tool such as openGL or DirectX, a display component 141 for supporting various types of model displaying and viewing (e.g., movement, rotation, magnification, and the like) based on the model data of the modeling kernel 132, and transmitting screen display data to the rendering component 142, a model selection processing component 143 for selecting and processing a model displayed based on the modeling kernel 132, a Graphical User Interface (GUI) component 150 for providing an interface with a user in relation to operations such as the displaying, selection and viewing of models, a function management component 120 for requesting the model selection operation of the user (a program developer or operator) from the model selection processing component 143 and controlling the GUI of user functions by controlling the GUI component 150 at the time of supporting user functions (e.g., a modeling function) including history/batch operations, redo/undo functions, etc., and a framework system 110 for making connections between a user main module (not shown in FIG. 1) and the individual components and connections between the components, and controlling the operations of the individual components.

The GUI component 150 can be implemented independent of the platform, and representative examples of a GUI platform are Microsoft Foundation Classes (MFC), QT, etc. MFC is a class library belonging to Microsoft Visual C++, which is an integrated development environment for Windows application programs, and provides a large number of classes useful in the creation of Windows application programs.

Further, QT is a cross platform widget toolkit for the development of GUI programs, can be implemented using C++, but provides bindings available for Python, Ruby, C, Perl, and Pascal, and also provides an application programming interface (API) for Structured Query Language (SQL) DB access, Extensible Markup Language (XML) processing, thread management, and single cross platform file management.

The widget can refer first of all to a small GUI tool which operates an application program on a computer Operating System (OS) and displays the results of the operation on the screen, or secondly can refer to a library in which user-centered graphic and data processing programs, frequently used at the time of creating application programs, are collected. For example, the reason for X Windows to have different forms depending on the window manager is that widget libraries are different from each other. The widget libraries, most frequently used at the present time, may be the QT library of the Linux desktop environment (K Desktop Environment: KDE) and the GTK+ library of the GNU Network Object Model Environment (GNOME).

The basic framework 100 of FIG. 1 corresponds to a framework presented in the present invention.

The basic framework 100 of FIG. 1 constructed by a framework provider as described above is provided to 3D application program developers (hereinafter "developers").

Accordingly, a program developer can extend or newly implement the components of the basic framework 100 of the present invention according to the circumstances. Implementing the user extension component 200 of FIG. 2, connects the user extension component 200 to the basic framework 100 of FIG. 1, so that the functions of the components of the basic framework 100 are extended. Thus, a 3D application program having the framework structure of FIG. 4 can be easily implemented.

Figure 2:
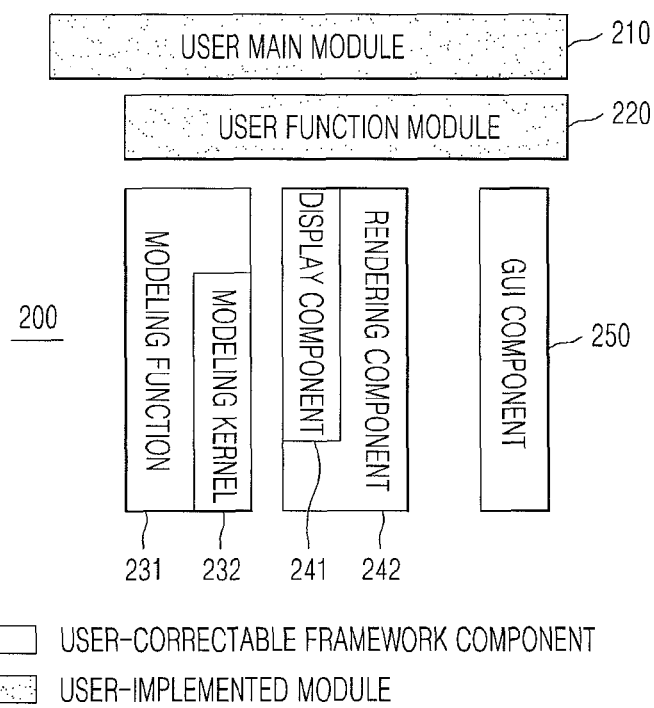
FIG. 2 is a diagram showing the structure of a user extension component according to an embodiment of the present invention.

As shown in FIG. 2, the user extension component 200 according to the present invention includes a user main module 210 corresponding to the frame of a 3D application program. Preferably, it can be implemented by a developer and configured to process a main window, a view window, a menu and a toolbar at the time of executing the 3D application program, a user function module 220 for allowing the developer to implement and register the operating functions of the 3D application program (a modeling function, a display manipulation function, etc.), a modeling function component 231 including a 3D modeling utility extended by the developer, a modeling kernel 232 for managing 3D model data extended by the developer, a display component 241 for supporting various types of model displaying and viewing (e.g., movement, rotation, magnification, and the like), extended by the developer, on the basis of the modeling kernel 232, a rendering component 242 for supporting a rendering tool extended and registered by the developer, and a Graphical User Interface (GUI) component 250 for providing an interface with a user in relation to operations such as displaying, selection and viewing of models extended by the developer.

In one embodiment of the present invention, the operation of implementing the user extension component 200 of FIG. 2 is described in detail below with reference to the signal flowchart of FIG. 3.

Figure 3:
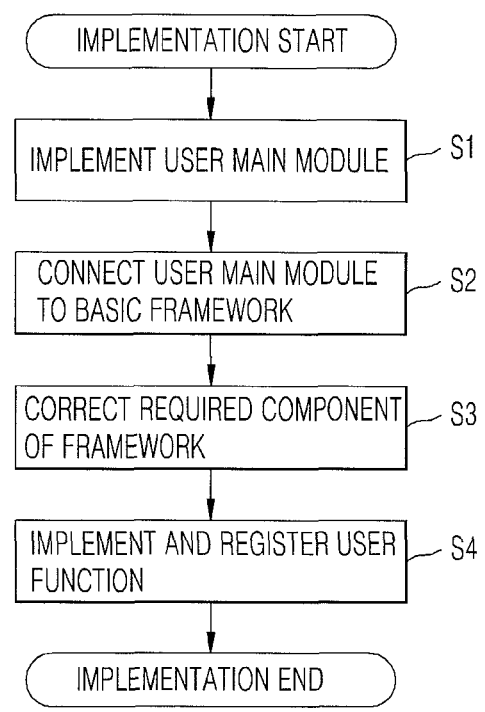
FIG. 3 is a signal flowchart showing a process for implementing a user extension component according to an embodiment of the present invention.

FIG. 3 is a signal flowchart showing the implementation of a user extension component. As shown, after the basic framework 100 has been installed in a development tool, a developer-defined operation project is created, and a user main module 210 for selecting the function of a 3D application program and performing the operation is implemented at step S1.

Further, the process proceeds to step S2 where which the basic framework 100 is connected to the user main module 210. The developer extends a user model function, a modeling function, a display function, and a GUI function, which are not included in the basic framework 100, and registers the functions in the basic framework 100 at step S3. Thereafter, the process proceeds to step S4 where a user function for executing and controlling the extended and registered functions is implemented and added to the basic framework 100, and thus the user function is implemented.

First, the developer, who purchased the basic framework 100 of FIG. 1, installs the basic framework 100 in a development tool (e.g., a computer), creates a developer-defined project, and implements the user main module 210 using the development tool to suit his or her desired 3D application program at step S1. The basic framework 100 can be recorded in a development tool-readable recording medium, e.g., a Compact Disk (CD), a Digital Versatile Disk (DVD) or Universal Serial Bus (USB) memory, and can be provided to the developer, or can be provided over a communication network such as the Internet. The user main module 210 includes menu, toolbar, main window, and view window functions.

Thereafter, in order to use the framework, the basic framework 100 is included in the created operation project, and is connected to the implemented user main module 210 at step S2.

Next, the developer extends and implements the user model function, modeling function, display function and GUI function, which are not included in the basic framework 100, and registers the functions in the modeling kernel 232, a modeling function component 231, the display component 241, the rendering component 242, and the GUI component 250, respectively, through the framework system 110. This enables the functions to be connected to the basic framework 100 at step S3.

Further, the developer implements a user function for executing and controlling the functions implemented and registered at steps S1 to S3, and registers the implemented user function in the user function module 220, thus enabling the user function to be connected to the basic framework 100 at step S4.

Therefore, through the above process, when the developer extends and registers the basic framework 100 by connecting the user extension component 200 to the basic framework 100, the 3D application program framework structure is finally implemented.

Figure 4:
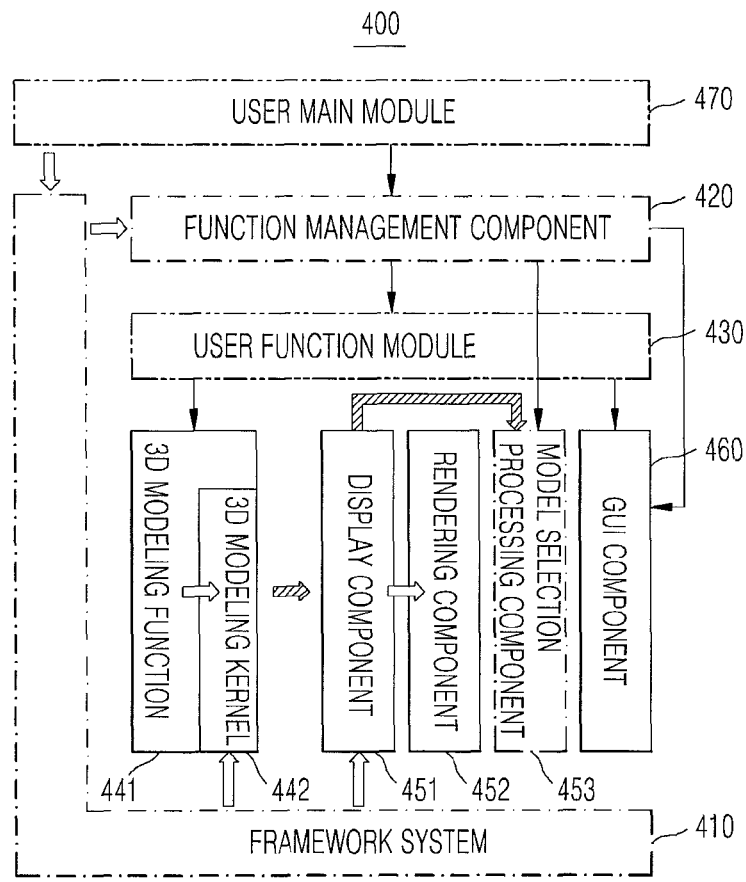
FIG. 4 is a diagram showing an application program framework structure implemented by the process of FIG. 3.

The above-described 3D application program framework structure is shown in FIG. 4, and includes a function management component 420 for supporting a model implementation and registration function to include functions such as history/ batch operations, redo/undo functions, a framework processor function, a user function module 430 for registering the operating function of 3D application software (a modeling function, a display manipulation function, and the like) implemented by the user, a user-extensible 3D modeling function component 441 including a 3D modeling utility, a user-extensible 3D modeling kernel 442 for managing at least one piece of 3D model data, a user-extensible display component 451 for supporting various types of model displaying and viewing (e.g., movement, rotation, magnification/reduction, and the like) on the basis of the 3D modeling kernel 442, a user-extensible rendering component 452 for supporting a rendering tool such as OpenGL or DirectX, a model selection processing component 453 for selecting and processing a model displayed based on the 3D modeling kernel 442, a user-extensible GUI component 460 for providing an interface with the user in relation to operations such as displaying, selection and viewing of models, a user main module 470 corresponding to the frame of 3D application software desired to be implemented by the user, and a framework system 410 for connecting the user main module 470 to the individual components and controlling the operation of the components.

A process for developing user application software based on the 3D application software framework is described below. The process includes creating a developer-defined operation project and implementing the user main module 470, connecting the framework system 410 to the user main module 470, selectively extending the 3D modeling function component 441, the 3D modeling kernel 442, the display component 451, the rendering component 452, and the GUI component 460 of the framework, and registering the selectively extended component in the framework system 410, and implementing a user function and registering the user function in the function management component 420. Hereinafter, a process in which the user develops application software on the basis of the framework will be described in detail.

First, after the developer who purchased the 3D application program framework installs the framework in a development system (e.g, a computer), he or she creates a user-defined project using a development tool (e.g., Visual Studio of Microsoft), and implements the user main module 470 using the development tool to suit his or her desired 3D application software. The user main module 470 includes a menu, a toolbar, a main window, a view window, and the like.

Thereafter, in order to use the framework, the framework is included in the created operation project, and the framework system 410 is connected to the user main module 470 implemented in the above procedure. Further, when a function which is not provided by the framework components is required, the developer selectively extends the 3D modeling function component 441, the 3D modeling kernel 442, the display component 451, the rendering component 452 and the GUI component 460 of the framework, and re-registering the selectively extended component in the framework system 410, thus connecting the selectively extended component to the framework and replacing an existing component with the selectively extended component.

Thereafter, the developer implements user functions, which are not included in the framework (e.g., a model editing function, a model loading/storage function, a preference setting function, and the like), and registers the user functions in the user function module 430, thus enabling the user functions to be connected to the framework.

Therefore, the developer implements the 3D application software through the above process. The 3D application software implemented through the above process is commercialized and is sold to the final user (e.g., a CAD operator, CAE designer, and the like).

In the above embodiment, the case where the basic framework implemented using the construction of FIG. 1 is provided to the developer to allow the developer to selectively extend the 3D modeling kernel, modeling function, display function and GUI function, has been described as an example. However, an embodiment can be configured such that a basic framework, which includes only the function management component, the model selection processing component, the user-extension component, and the framework system, is provided to the developer, and thus the developer can add a 3D modeling kernel, a modeling function, a display function, and a GUI function to the basic framework.

Meanwhile, when a single 3D application program is commercialized through the above process, the final user who purchased the 3D application program (hereinafter "operator") performs an operation which implements a desired model using the 3D application program. The procedure of the operation using the 3D application program implemented by the above operation is described below, with reference to the shown framework structure.

First, when the operator executes the 3D application program on the computer, the main window, view window, various menus, toolbar, and the like, implemented in the user main module 470, are displayed. That is, when the operator runs the 3D application program, the user main module 470 transmits a user function required by the 3D application program to the function management component 420. After the 3D application program has been initialized, the main window, view window, menus and toolbar implemented in the user main module 470 are displayed.

Thereafter, the user main module 470 transmits user input to the framework system 410, and the framework system 410 requests the execution of a function corresponding to the user input from the function management component 420 so as to execute the function corresponding to the user input. When the user manipulates the toolbar, menus, and the like, the framework system 410 requests the execution of the function corresponding to the manipulation from the function management component 420.

In this case, the function management component 420 executes the function corresponding to the user input on the user function module 430, requests the generation of a GUI element corresponding to the executed function from the GUI component 460 through the user function module 430, and controls the GUI component 150 to control the GUI of the user function.

Accordingly, the GUI component 460 generates the relevant GUI element, displays the GUI element on the screen and generates a relevant event according to the user's manipulation on the GUI, and the function management component 420 transmits the event to a corresponding user function.

For example, when the operator executes a modeling function, which is one of the user functions, it uses the menus or toolbar. The function management component 420 then executes the requested modeling function by checking the user function module 430, and subsequently operates the GUI component 460 through the user function module 430, thus enabling the screen of the relevant modeling functions to be displayed.

Thereafter, when the operator clicks a button corresponding to a desired modeling operation, an event is generated by the GUI component 460 and is transmitted to the function management component 420. The function management component 420 transmits the event to the modeling function which is included in the user function module 430 and is currently being executed. The modeling function, having received the event, executes the relevant modeling operation on the modeling kernel 442 using the modeling utility of the modeling function component 441. At this time, the results of the modeling operation are displayed on the screen in cooperation with the display component 451.

Thereafter, the operator selects an element (e.g., a point, a line, a plane, and the like) desired to be operated by the operator from the model displayed on the screen. The function management component 420 finds a relevant model selection function corresponding to the selection of the operator from the user function module 430, and then executes the model selection function. By the execution of the model selection function, the model selection processing component 453 performs an actual model selection operation using screen display model data present in the display component 451. The display component 451 controls the rendering component 452 so that the results of model selection are displayed on the screen.

Thereafter, as a modeling operation is performed according to the user's manipulation, the display component 441 updates the screen display model data with reference to the model data to which the modeling operation of the 3D modeling kernel 442 can be applied, and controls the rendering component 442 so that the results of the relevant modeling operation can be displayed on the screen.

Accordingly, when the operator performs a correction operation (e.g., creation, deletion, copy, rotation, movement, and the like) on the model displayed on the screen by using a mouse, a keyboard, or a corresponding button on the GUI, the function management component 420 performs a modeling operation through the 3D modeling function 441 by controlling the modeling function, which is currently being executed and is included in the user function module 430, according to the correction operation. This allows for an actual correction operation to be performed on the relevant model, and the results of the operation are applied to the model data present in the 3D modeling kernel 442, and thus the operator's desired model data is produced.

Thereafter, the display component 451 updates the screen display model data with reference to the model data to which the results of the modeling operation of the 3D modeling kernel 442 are applied, and controls the rendering component 452 to display the results of the modeling operation on the screen.

As described in detail above, the 3D application program framework according to the present invention is a system solution, which supports an entire process ranging from the development of a 3D application program to the maintenance of the 3D application program, and by which the user can easily, rapidly and reliably create a desired 3D application program.

Therefore, the present invention provides components such as a modeling kernel, a display module and a selection module, thus realizing an advantage in that the period and cost required for the development of 3D application programs used in CAD/CAM/CAE engineering, game/video processing, and other geographic processing fields can be reduced by a minimum of 40%, and, in particular, by more than 70% in the case of maintenance cost.

The present invention provides components that can be essentially implemented by the user, so that the user can easily develop 3D application programs without the know-how of 3D application programs which can be acquired by the user from operations over a period of several years, thus obtaining an effect of shortening the work time.

Further, the present invention provides an advantage in that, since components to be essentially implemented by the user are provided, the components can be used in common even when multiple operations are simultaneously performed, thus maximizing the optimization of memory, and in that the user is allowed to concentrate on a desired unique operation, thus enabling the best application program to be implemented.

Next, an automated test system based on the above-described 3D application program framework structure will be described. First, the automated test system automatically generates a test case by recording the history of functions executed by the user, and is then capable of testing the functions of relevant application software using the test case, regardless of changes in the GUI and the source code.

Figure 5:
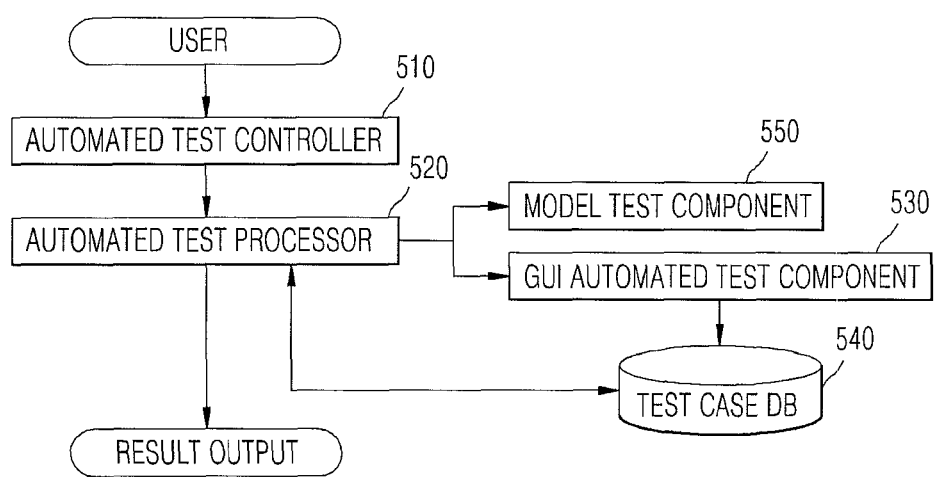
FIG. 5 is a block diagram showing an automated test system according to an embodiment of the present invention.

The above-described automated test system according to the present invention is described with reference to the block diagram of FIG. 5.

First, the automated test system is configured to include a database (DB) 540 for storing at least one test case, a GUI automated test component 530 for automatically generating the test case of a unit function, storing the generated test case in the DB 240, and performing the test of a GUI, an automated test processor 520 configured such that, when an automated unit function test is intended to be executed, the automated test processor 520 automatically generates/stores a relevant test case by running the GUI automated test component 530, and executes the automated unit function test on the 3D application program of the framework structure, which is an automated test target, on the basis of the relevant test case recorded in the DB 540, and such that, when a process test is intended to be conducted, the automated test processor 520 generates/stores a test case in the DB 540 by recording the user's manipulation on all application software, and executes the process test on the 3D application program of the framework structure, which is the automated test target, on the basis of the relevant test case recorded in the DB 540, and thus provides the results of the execution to the user, a model test component 550 for performing comparison/verification with model data stored in the DB 540 for individual test steps of the automated unit function test and the process test, and notifying the automated test processor 520 of the results of the verification, and an automated test controller 510 for executing the operation of the automated test processor 520 when the automated test by the user is detected, and controlling the automated test processor 520 using test methods based on the settings made by the user.

The automated test system having the above construction is a system for testing the framework-based 3D application software. The operations and effects of the embodiment of the present invention, constructed as described above, are described in detail below with reference to FIGS. 6 to 9.

Figure 6:
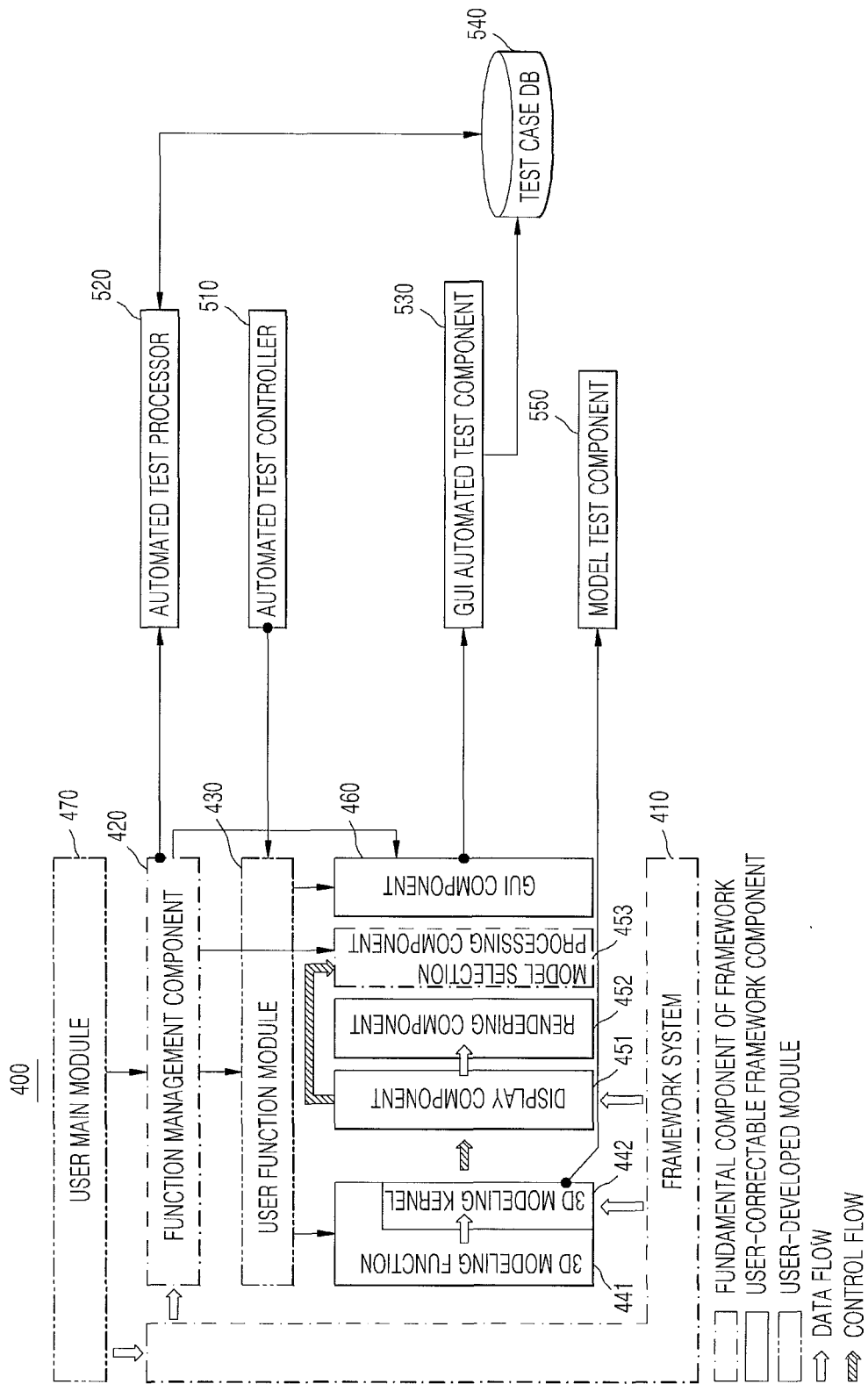
FIG. 6 is a diagram showing connections for the automated testing of 3D modeling application software according to an embodiment of the present invention.
Figure 7:
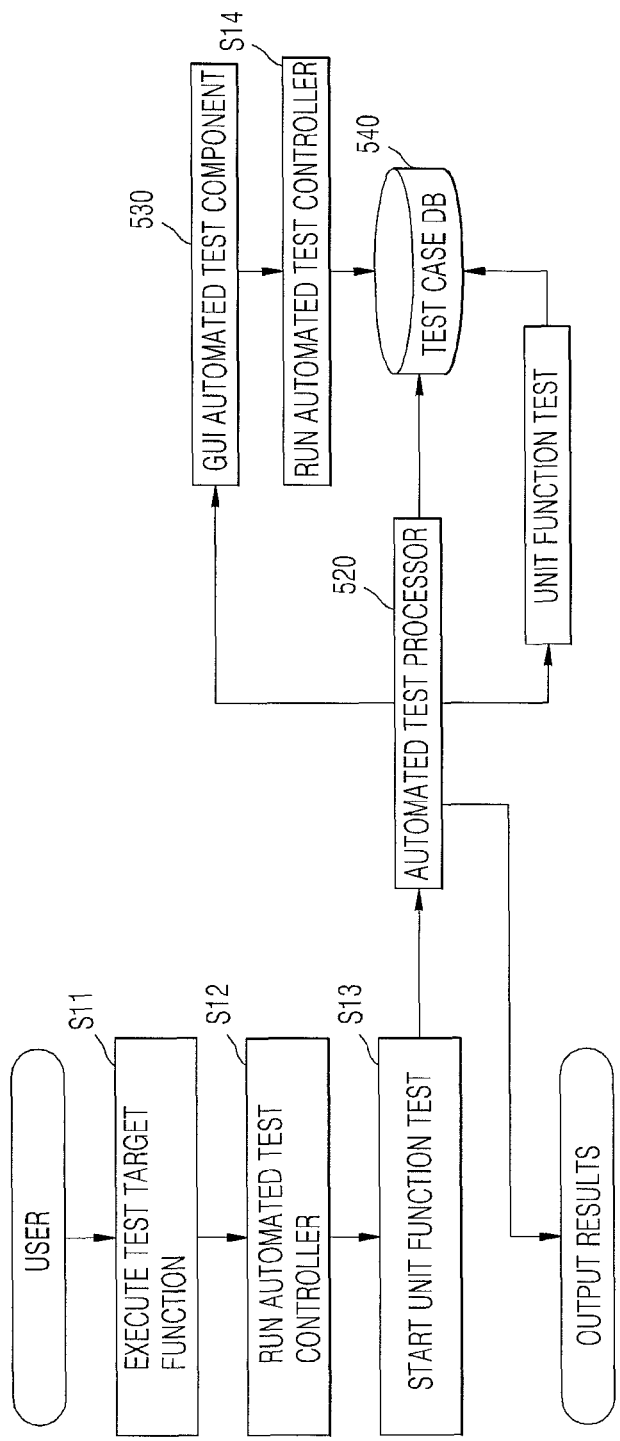
FIG. 7 is a signal flowchart showing a unit function test process according to an embodiment of the present invention.
Figure 8:
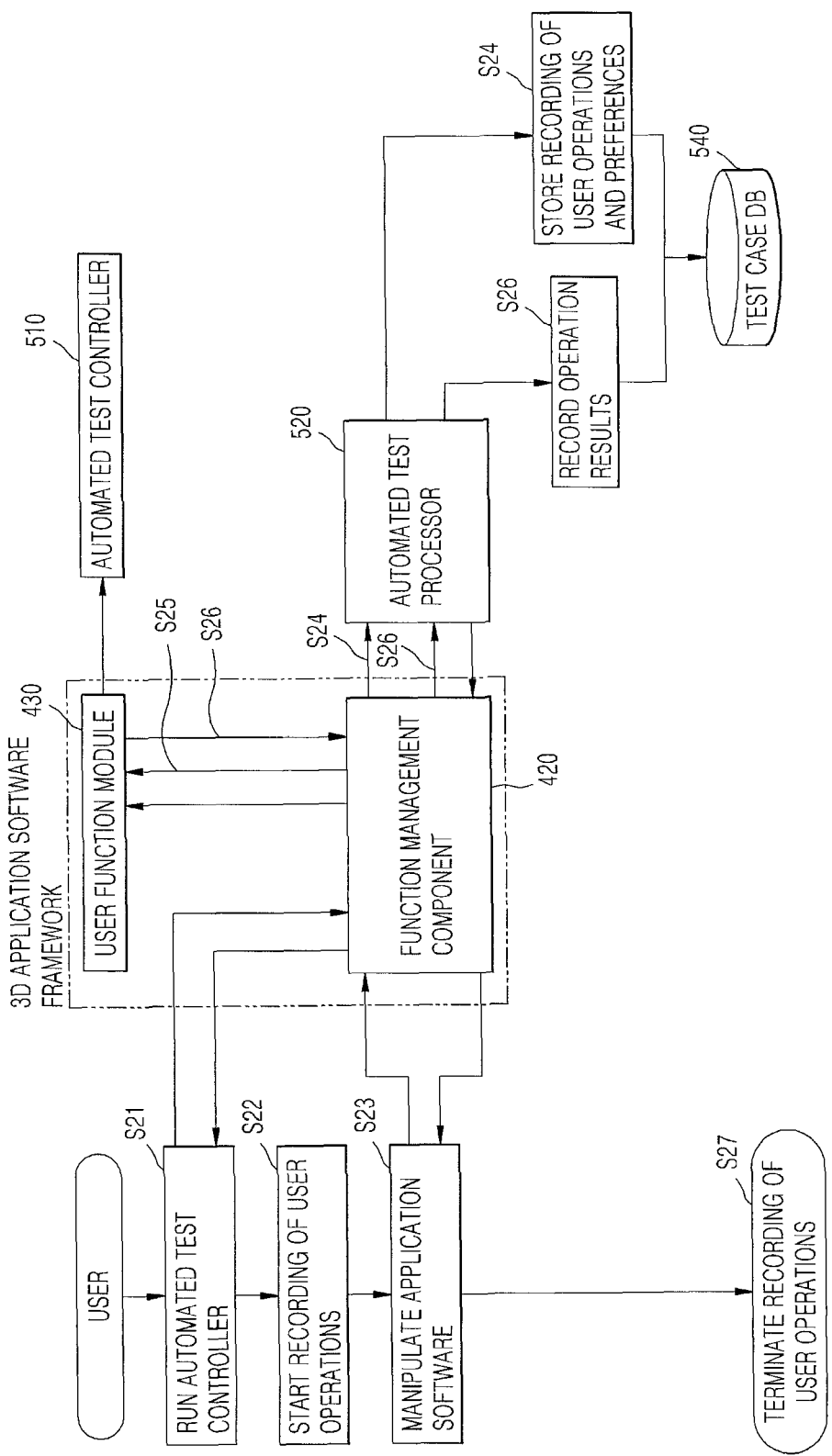
FIG. 8 is a signal flowchart showing a process test case generation procedure according to an embodiment of the present invention.
Figure 9:
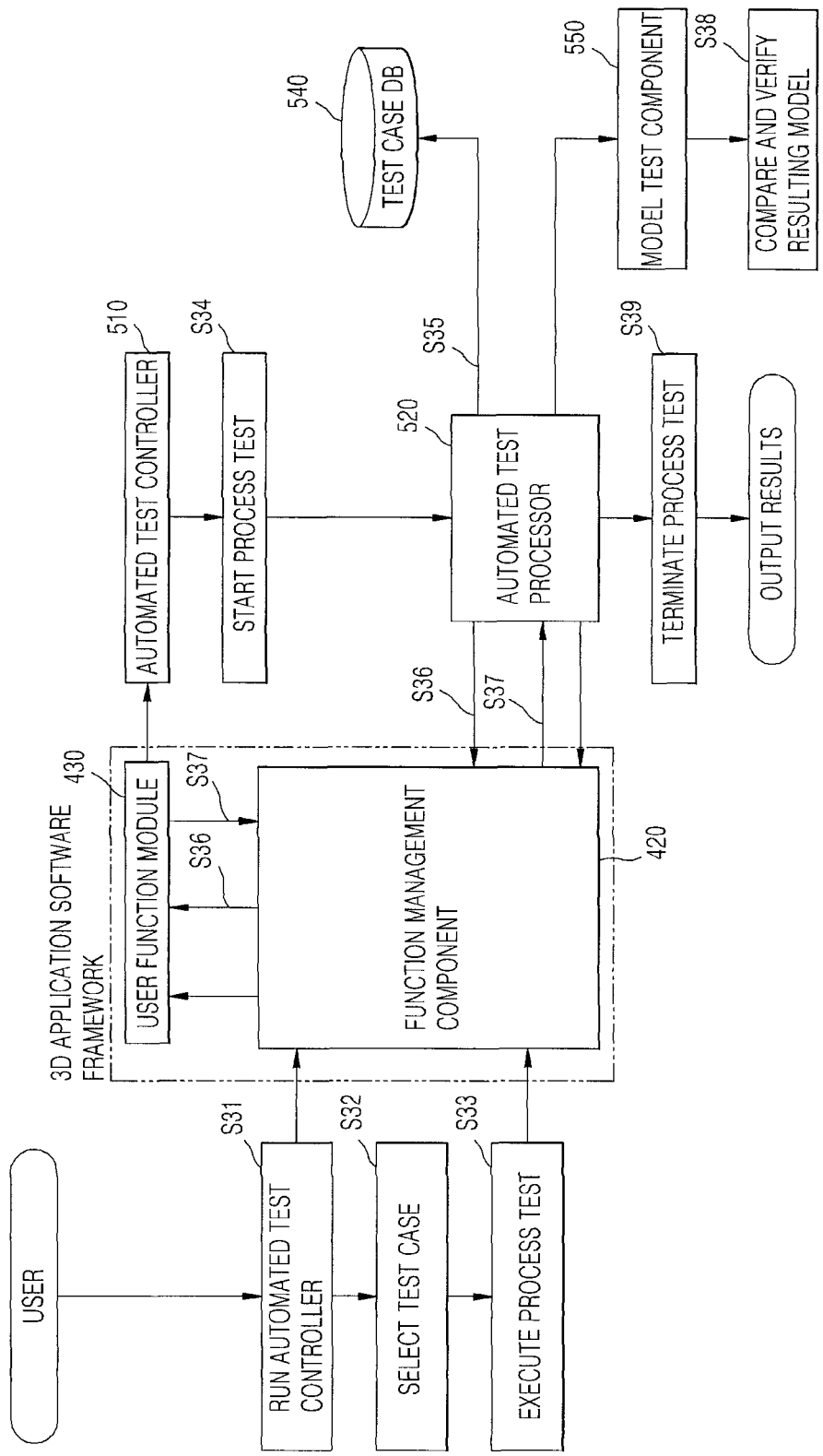
FIG. 9 is a signal flowchart showing a process test procedure according to an embodiment of the present invention.

FIG. 6 is a diagram showing a method of implementing a framework-based automated test system and the connections of the automated test system according to one embodiment of the present invention. FIG. 7 is a signal flowchart showing a unit function test process according to an embodiment of the present invention. FIG. 8 is a signal flowchart showing a process test case generation procedure according to the embodiment of the present invention, and FIG. 9 is a signal flowchart showing a process test procedure according to an embodiment of the present invention.

First, a method and function of implementing the automated test system is described with reference to FIG. 6. The framework-based automated test system can be implemented such that a 3D application software framework can be tested in the present invention. The automated test controller 510 provides a function of controlling both the automated unit function test and the process test to the 3D application software. The automated test processor 520 is implemented based on the framework processor of the function management component 520 functioning as the OS of the framework and provides a function of processing the automated unit function test and the process test to the 3D application software. The GUI automated test component 530 is implemented based on the GUI component 560 and is configured to automatically generate the unit function test case of the 3D application software on the basis of the input value of the GUI and to operate the GUI according to the generated test case, thus supporting the automated unit function test. The model test component 550 can be implemented based on the 3D modeling kernel 442 and can be configured to perform more precise comparison/verification with the resulting model data stored in the DB 540 for individual test steps of the automated unit function test and the process test of the 3D application software.

The automated test system implemented in this way can be connected to the framework and replaces the framework, so that the 3D application software can be automatically tested. This process will be described in detail below.

After a framework-based 3D application software developer purchases the automated test system and installs the automated test system in a development system (e.g., a computer), he or she allows the automated test system to be included in an operation project.

Further, the automated test controller 510 can be added to the user function module 430 of the framework, and the automated test processor 520 can be registered in the framework and then replace the framework processor of the existing function management component 420. The GUI automated test component 530 is registered in the framework and then replaces the GUI component 460 of the existing framework. The model test component 550 can be registered in the framework and then replaces the existing modeling kernel 442. As a result, the framework-based 3D application software can be automatically tested.

Therefore, an automated unit function test process based on the construction of FIG. 6 is described with reference to FIG. 4.

A user executes a test target function included in the user function module 430 at step S11, and runs the automated test controller 510 also included in the user function module 430 at step S12. When a unit function test is executed via this procedure at step S13, the automated test controller 510 runs the automated test processor 520, and the automated test processor 520 allows the GUI automated test component 530 to automatically generate a test case at step S14.

The GUI automated test component 530 generates at least one test case according to the GUI input value of a relevant unit function, and stores the generated test case in the DB 540.

Thereafter, the automated test processor 520 operates a GUI using the GUI automated test component 530 on the basis of the test case stored in the DB 540, and executes the automated unit function test on the 3D application program. The model test component 550 performs comparison/verification with the model data stored in the DB 540 for individual test steps of the automated unit function test, and notifies the automated test processor 520 of the results of the verification. When the execution of the automated test has been completed, the automated test processor 520 outputs the results of the test and provides the test results to the user.

Further, a process test procedure based on the construction of FIG. 6 is described with reference to FIGS. 8 and 9.

As shown in FIG. 8, when the user requests the running of the automated test controller 510 at step S21, the function management component 420 of the framework runs the automated test controller 510 included in the user function module 430. When the user starts the recording of user operations via the automated test controller 510 at step S22, the automated test processor 520 records all subsequent operations of the user at step S23, and then generates a process test case. A detailed procedure thereof is described below.

The automated test processor 520 monitors the user function execution procedure of the user function module 430 conducted in the framework according to the user's manipulation on all application programs at step S23, stores the execution procedure and preferences thereof at step S24, and stores the results of the execution such as performance and the amount of memory used, as well as the model data such as 3D model data, for individual execution steps, thus generating a process test case.

Thereafter, when the user stops the recording of user operations through the automated test controller 510, the automated test controller 510 registers the generated process test case in the DB 540. Further, as shown in FIG. 9, when the user runs the automated test controller 510, selects the process test case, generated using the procedure of FIG. 8, from the DB 540 through the automated test controller 510 at step S32, and executes the process test at step S33, the automated test controller 510 runs the automated test processor 520 at step S34. The automated test processor 520 executes the process test on the 3D application program on the basis of the test case selected by the user. A detailed procedure thereof will be described below.

The automated test controller 510 reads the selected test case from the DB 540 at step S35, and notifies the function management component 420 of the framework that a user function included in the user function module 430 is to be executed and manipulated according to a function execution procedure in the test case at step S36.

Whenever each execution procedure of the function is terminated at step S37, the automated test processor 520 performs comparison on the execution performance and the amount of memory used, and the model test component 550 precisely compares/verifies test result data thereof with result data stored in the DB 540, and notifies the automated test processor 520 of the results of the verification.

Thereafter, when the process test has been completed by performing all test procedures at step S39, the automated test processor 520 outputs the results of the test to the display, and then provides the test results to the user.

As described above, the automated test system according to the present invention is a system solution, which supports automated tests in the stage of the development and distribution of 3D application software on the basis of the 3D application software framework, and by which the developer can easily and rapidly develop reliable 3D application software.

Further, the automated test system enables a complicated process test, which was repeatedly performed by manual operations in an existing maintenance process, to be automated, and enables repeated testing to be equally performed under any environment, thus reducing the period and cost required for the development of 3D application software and improving production quality.

In particular, the present invention not only tests performance, memory usage, and errors on all functions of 3D application software by using a unit function test and a process test, but it can record all execution environments including but not limited to, user preferences influencing a test function, thus overcoming the problems of conventional automated test technology which has difficulty in performing reliable testing such as in a 3D screen manipulation or a model selection operation. Further, the present invention can provide 3D application software framework-based automated test components, which precisely compares/analyzes complicated result data such as 3D model data to aid the user to promptly correct errors, thus enabling an automated test function to be executed on 3D application software, developed by the framework user, with minimal effort.

Meanwhile, the above-described embodiments of the present invention are presented to promote comprehension by those skilled in the art. The present invention is not limited or restricted to the above-described embodiments, as various modifications and changes can be made without departing from the scope and spirit of the invention, and other embodiments based on the above modifications and changes can also be implemented.

As described above, a 3D application program framework structure, a method of implementing an application program based on the framework structure, and a 3D application software framework-based automated test system and method according to the present invention are advantageous in that a framework including events to be implemented by a user (e.g., a developer) and system environment management and functions is provided, thus allowing the developer to easily extend user models, the actually required modeling function, and the GUI, and in that a development infrastructure enabling the development of 3D modeling application programs to be efficiently performed is constructed, thus sufficiently improving the value of the application of the framework to the key industry.

The following is a list of relevant parts shown in the figures and their corresponding reference numbers.

110, 410: framework system
120, 420: function management component
131, 231, 441: modeling function component
132, 232, 442: modeling kernel
141, 241, 451: display component
142, 242, 452: rendering component
143, 453: model selection processing component
150, 250, 460: GUI component
210, 470: user main module
220, 430: user function module
510: automated test controller
520: automated test processor
530: GUI automated test component
540: database (DB)
550: model test component

The invention claimed is:

1. An automated test system for testing 3D application software based on 3D application program framework structure, the 3D application program framework structure comprising:

a model selection processing component selecting and processing various types of models displayed based on a 3D model library;

a user extension component enabling a user to extend a 3D modeling kernel, modeling functions, display functions and Graphical User Interface (GUI) functions;

a function management component requesting execution of the functions from the user extension component according to user input, and requesting a model selection operation from the model selection processing component;

a user main module processing a main window, a view window, a menu, and a toolbar when a 3D application program is executed on a computer; and a framework system connecting said components to the user main module, and controlling operation of said components according to the user's manipulation, and the automated test system comprising:

a database (DB) storing at least one test case generated based on functions executed by the user;

an automated test processor recording the functions executed by the user, executing an automated test on a 3D application software based on the test case recorded in the DB, and providing results of the execution to the user;

a model test component performing comparison and/or verification with model data stored in the DB for individual steps of the automated test and a process test, and notifying the automated test processor of results of the verification; and an automated test controller setting an operation mode of the automated test processor at a request of the user when the automated test is detected, and executing an operation of the automated test processor, wherein the automated test processor is implemented based on a framework processor of the function management component and replaces the framework processor of the function management component, thereby adding a function of processing the automated test and the process test to the 3D application software.

2. The automated test system according to claim 1, wherein, when the process test is executed, the automated test processor records the user's execution on the 3D application software, generates the test case and/or stores the test case in the DB, and executes the process test on the 3D application software based on the test case stored in the DB.

3. The automated test system according to claim 1, wherein the automated test controller is inserted into or added to a user function module and is configured to add a function of controlling the automated test and the process test to the 3D application software.

4. The automated test system according to claim 1, wherein the model test component is implemented based on the 3D modeling kernel and replaces the 3D modeling kernel, thereby adding at least one of a comparison function and a verification function to the 3D application software for individual test steps of the process test so that the model test component improves precision compared to the model data stored in the DB.

5. An automated test method of testing 3D application software using an automated test system based on 3D application program framework structure, the 3D application program framework structure including a model selection processing component selecting and processing various types of models displayed based on a 3D model library, a user extension component enabling a user to extend a 3D modeling kernel, modeling functions, display functions and Graphical User Interface (GUI) functions, function management component requesting execution of the functions from the user extension component according to user input, and requesting a model selection operation from the model selection processing component, a user main module processing a main window, a view window, a menu, and a toolbar when a 3D application program is executed on a computer, and a framework system connecting said components to the user main module, and controlling operation of said components according to the user's manipulation, and the automated test system including a database (DB) storing at least one test case generated based on functions executed by the user, an automated test processor recording the functions executed by the user, executing an automated test on a 3D application software based on the test case recorded in the DB, and providing results of the execution to the user, wherein the automated test processor is implemented based on a framework processor of the function management component and replaces the framework processor of the function management component, thereby adding a function of processing the automated test and the process test to the 3D application software, a model test component performing comparison and/or verification with model data stored in the DB at individual steps of the automated test and a process test, and notifying the automated test processor of results of the verification, and an automated test controller setting an operation mode of the automated test processor at a request of the user when the automated test is detected, and executing an operation of the automated test processor, the automated test method comprising:

a) determining whether the automated test is to be executed;

b) if the automated test is executed, recording the functions executed by the user;

c) generating and storing the test case based on the recorded functions executed by the user;

d) testing the 3D application software based on the test case; and e) providing results of the test to the user.

6. The automated test method according to claim 5, further comprising:

f) when the automated test is detected, setting a processing mode for the automated test at a request of the user.

7. The automated test method according to claim 5, wherein the step of testing the 3D application software includes:

d-1) if the process test is executed, recording the user's execution on the 3D application software, and then generating and storing the test case; and d-2) executing the process test on the 3D application software based on the test case.

8. The automated test method according to claim 7, wherein the step of testing the 3D application software further comprises:

d-3) performing at least one of, comparison and verification with model data stored in the DB for individual test steps of the process test; and d-4) feeding results of the verification back to the individual test steps, and then notifying the user of the results of the verification.

* * * * *